Sept. 26, 1961  G. A. LYON  3,001,496
METHOD OF MAKING WHEEL COVERS
Filed June 11, 1958  2 Sheets-Sheet 1

Inventor
GEORGE ALBERT LYON
by Hill, Sherman, Meroni, Gross & Simpson
Attys.

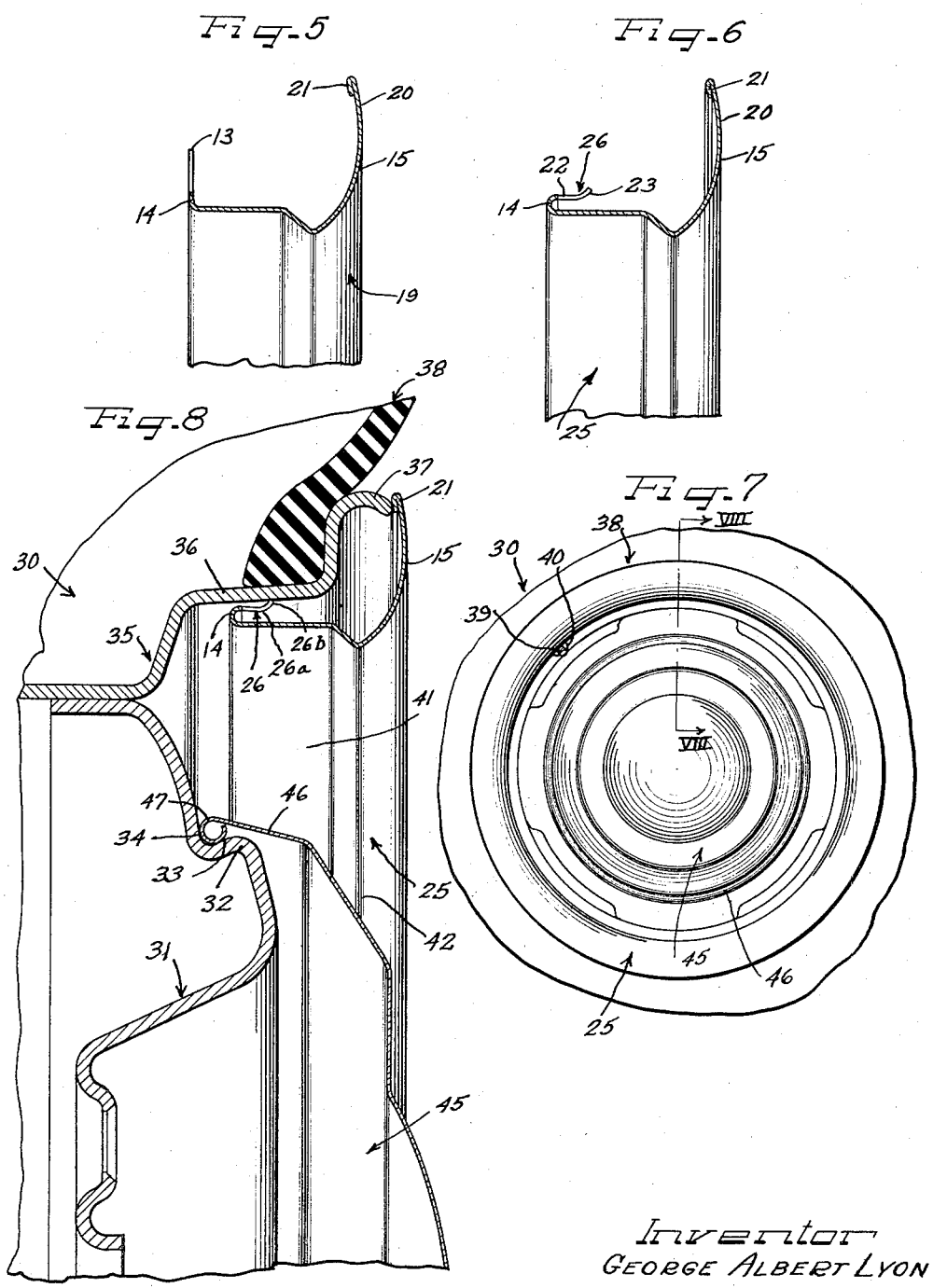

United States Patent Office 3,001,496
Patented Sept. 26, 1961

3,001,496
METHOD OF MAKING WHEEL COVERS
George Albert Lyon, 13881 W. Chicago Blvd.,
Detroit 28, Mich.
Filed June 11, 1958, Ser. No. 741,384
1 Claim. (Cl. 113—116)

The present invention relates generally to wheel structures and more particularly to a new and improved method of forming a wheel cover member here illustrated in the form of a trim ring.

The trim ring of the present invention is adapted to be formed from a length of stock which stock is subjected to a spiraling as well as a dishing operation with the dishing operation resulting in the provision of radially outwardly extending axially spaced flange areas disposed at the axially inner and outer margins of the length of stock. The spiraled dished length of stock is then cut transversely at intervals along the length thereof to form split-ring portions. The ends of the split-ring portions are then moved axially into abutment with respect to one another and butt welded or otherwise suitably secured together to form a circular annular trim ring blank. The axially inner marginal edge area is then adapted to be formed to provide it with circumferentially spaced resiliently deflectable circularly arranged retaining extensions. The axially outer flange area is then adapted to be radially arched with the outer marginal edge turned under to form a reinforcing bead.

Where a piece of metal is divided into half with the dividing line comprising a undulated path way the axially inner radially outer flange area on the trim ring blank is then afforded with extension blank portions which may be ultimately formed into circularly arranged resiliently deflectable retaining elements.

Accordingly, an important object of the present invention is to provide a new and improved method of manufacturing trim ring members for disposition on the outer side of a vehicle wheel.

Still another object of the present invention is to provide a method of manufacturing trim ring members which method may be carried out with absolutely no waste of material in the fewest number of steps.

Yet another object of the present invention is to provide a method of forming trim ring members having axially spaced radially outwardly extending flange areas which flange areas are worked during the formation of the trim rings.

Other objects and features of the present invention will more fully become apparent in view of the following detailed description taken in conjunction with the accompanying drawings illustrating therein a single embodiment and in which:

FIGURE 5 is an enlarged fragmentary cross-sectional view of the trim ring blank shown in FIGURE 4 only with the outer margin of the trim ring formed to shape;

FIGURE 6 is an enlarged fragmentary cross-sectional view similar to FIGURE 5 only showing the inner margin of the trim ring blank formed with retaining extensions to thereby provide a trim ring member;

FIGURE 7 is a side elevation of a wheel structure including the trim ring member formed in accordance with the principles of the present invention; and FIGURE 8 is an enlarged fragmentary cross-sectional view taken substantially on the line VIII—VIII of FIGURE 7 looking in the direction indicated by the arrows.

Figure 1:
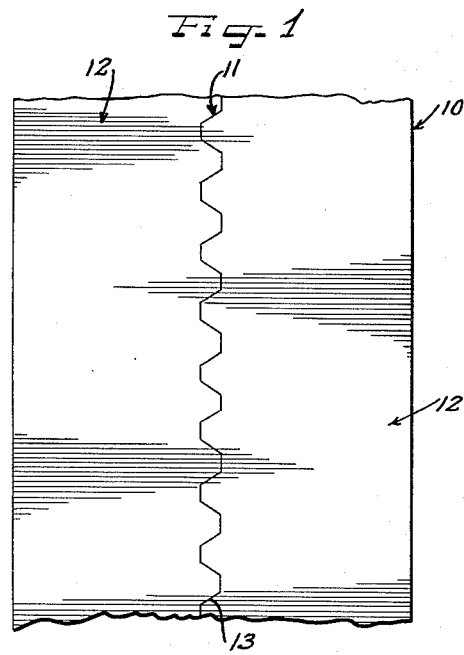
FIGURE 1 is an enlarged fragmentary plan view of a piece of material cut into lengths.
Figure 2:
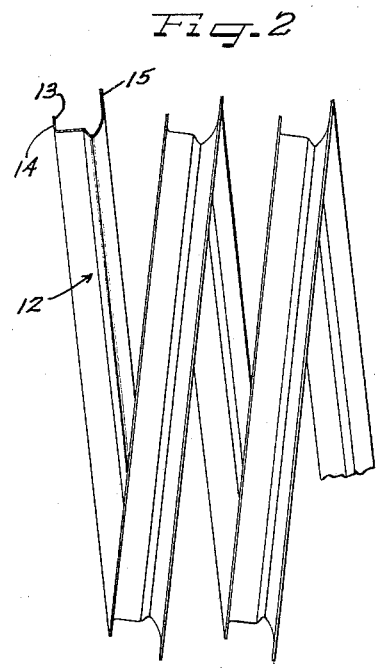
FIGURE 2 is a fragmentary side elevation of a spiraled dished length of material.
Figure 3:
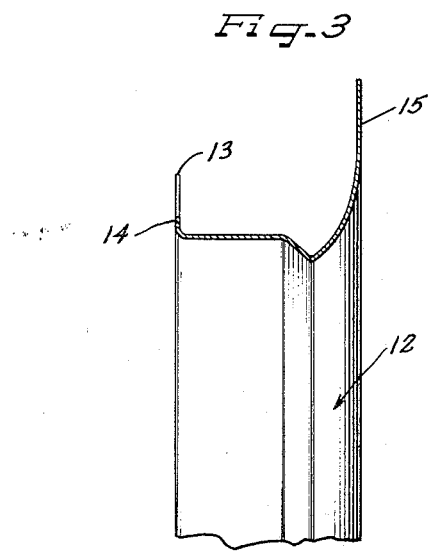
FIGURE 3 is an enlarged fragmentary cross sectional view of a portion of the length of material shown in FIGURE 2.

The reference numeral 10 in FIGURE 1 indicates generally a piece or length of sheet stock of metal which may be of any suitable type such as stainless steel. According to the initial step the piece of stock is divided along a tortuous line 11 to form the piece of stock into separate lengths of material indicated generally at 12. It should be noted at this juncture that one of the margins of each of the lengths of stock 12 is provided with an undulated edge indicated generally at 13 in FIGURE 1.

The lengths of stock or material 12 are then subjected to a spiralling as well as a dishing operation whereby the general cross-sectional configuration of the trim ring is imparted to the length of stock 12. In this respect it should be noted that during the dishing operation the length of stock is afforded with axially spaced radially outwardly directed flange areas 14 and 15 with the axially innermost flange area being disposed at the inner margin of the spiraled length of stock and with the flange area 15 disposed at the axially outermost area of the spiraled length of stock. Still further, the radially outwardly extending flange area 15 extends substantially radially outwardly of the axially inner marginal flange area 14 as well as radially outwardly of the undulated marginal edge 13 provided on the inner marginal flange area 14.

Figure 4:
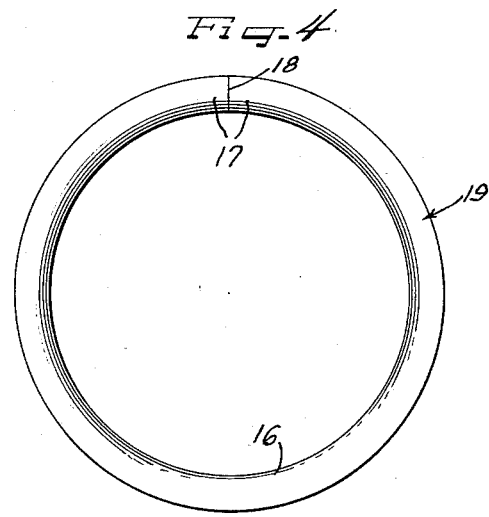
FIGURE 4 is a front elevation of a trim ring blank formed from a portion of the spiraled length of material.

The spiraled dished length of stock 12 is then cut transversely at selected intervals along its length forming split ring portions 16 as indicated in FIGURE 4. Ends 17 of the split ring portion 16 are then moved axially into confronting abutting relation whereupon the ends 17 are suitably fastened at 18 by means such as butt welding and the like. It is in this manner that a trim ring blank 19 is formed.

Suitably but preferably after the trim ring blank has been formed the axially outer flange area 15 is radially arched at 20 and underturned at 21 to provide an annular bead at the radially outer edge area of the flange area 15.

The radially outwardly extending inner marginal flange area 14 as well as the undulated edge 13 is then adapted to be reverse bent and curled in an axially outwardly extending direction as indicated at 22 and then in a generally radially and axially outwardly extending direction as indicated at 23 to thereby complete the formation of an annular trim ring member indicated generally at 25. It is in this manner that the trim ring member 25 is afforded with circumferentially spaced circularly arranged resiliently deflectable cover retaining extensions indicated generally at 26. Shown in FIGURES 7 and 8 is a wheel structure indicated generally at 30. The wheel structure 30 includes a body part 31 having an annular bulged area 32 providing an axially inwardly radially outwardly facing annular shoulder area indicated generally at 33. The bulged area 32 also provides an annular seat indicated generally at 34. Fastened to the body part 31 at its radially outer margin is a stepped multi-flanged tire rim designated generally at 35. The tire rim 35 includes an intermediate rim flange 36 as well as a curled terminal rim flange 37. Mounted upon the tire rim is a pneumatic tire assembly designated generally at 38 which tire assembly is preferably of the tubeless type and possesses a valve stem 39 for inflating the tire.

The trim ring member 25 may be applied to the tire rim 35 by centering ring opening 40 with respect to the valve stem 39 and pressing the trim ring member 25 axially against the wheel in a manner whereby the resiliently deflectable retaining extensions 26 retainingly engage with the intermediate rim flange 36 to thereby sustain the trim ring member 25 upon the wheel.

The trim ring member 25 is possessed of the radially outwardly extending axially outer flange area 15 and the bead 21 is adapted to be bottomed against the terminal rim flange 37. To remove the ring 25 from the wheel a pry-off tool may be inserted underneath the bead 21 and upon the application of a suitable pry-off force the trim ring may be ejected from the wheel.

It will be noted that the cover or ring member 25 is possessed of a generally axially inwardly extending ring portion 41 which comprises the bottom of the dish and joins the axially inner marginal area 14 with the axially outer marginal area 15. Disposed at the junction of the ring portion 41 with the axially outer flange area 15 is an annular radially inwardly bulged area designated generally at 42 which functions to reinforce the outer marginal flange area 15 as well as the ring portion 41 to provide a rigidified structure.

It is evident from a study of FIGURE 8 that each of the extensions 26 includes an axially outwardly extending extension portion 26a as well as a radially and axially outwardly extending extension portion 26b which portion 26b has its outermost edge adapted for biting engagement with the rim flange 36 to sustain the ring member 25 upon the wheel.

Also carried upon the wheel is a central hub cap member designated generally at 45 which member possesses an axially inner marginal area 46 terminating in an annular beaded area 47. The outer marginal area 46 as well as the beaded area 47 is adapted to resiliently flex radially to enable the hub cap member 45 to be aligned with the annular bulged area 32 so that the hub cap member 45 may be pressed into assembly with the wheel. When the hub cap member 45 is engaged in assembly on the wheel the bead area is retainingly lodged behind the body part annular shoulder area 33 in the annular seat area 34.

To remove the hub cap member 45 from the wheel a suitable pry-off tool may be inserted underneath the beaded margin 47 to release it from its tensioned engagement with the bulged area 32 of the body part.

It will be understood that modifications and variations may be effected without departing from the scope of the novel concepts of the present invention.

I claim as my invention:

In a method of forming trim rings for disposition upon the outer side of a vehicle wheel and being of the type having retaining fingers integral with a radially inner ring margin of each of the rings, the steps of slitting a length of stock along its length on a serpentine line forming lengths of material leaving one of the marginal edges of the length of material undulated, spiraling the length of material and transversely dishing the length of material forming annular radially outwardly extending flange areas axially spaced along the opposite margins of the length of material with the axially outermost flange area projecting radially outwardly of the axially innermost flange area and with the axially innermost flange area bearing the undulated marginal edge, transversely cutting the length of material along its length forming split-ring portions, butt fastening the ends of each of the split-ring portions to form a trim ring blank with the undulated marginal edge disposed at the axially and radially inner end of the trim ring blank, and reverse bending the radially inner marginal flange as well as the undulated marginal edge while forming the undulated marginal edge into retaining fingers thereby converting the trim ring blank into a trim ring, the fingers being reverse bent so as to each comprise an axially extending extension portion overlying an inner margin of the trim ring blank and an axially and radially outwardly extending extension terminal portion for biting engagement with the wheel.

References Cited in the file of this patent

UNITED STATES PATENTS

| 1,753,586 | Warwick | Apr. 8, 1930 |
| 2,368,229 | Lyon | Jan. 30, 1945 |
| 2,707,449 | Lyon | May 3, 1955 |
| 2,807,226 | Lyon | Sept. 24, 1957 |

FOREIGN PATENTS

| 467,114 | Canada | Aug. 8, 1950 |